(12) United States Patent
Calderon et al.

(10) Patent No.: US 7,413,647 B2
(45) Date of Patent: Aug. 19, 2008

(54) METHOD AND APPARATUS FOR UPGRADING BITUMINOUS MATERIAL

(76) Inventors: Albert Calderon, P.O. Box 126, 500 Lehman Ave., Bowling Green, OH (US) 43402; Terry James Laubis, P.O. Box 126, 500 Lehman Ave., Bowling Green, OH (US) 43402; Richard Owen McCarthy, P.O. Box 126, 500 Lehman Ave., Bowling Green, OH (US) 43402

( * ) Notice: Subject to any disclaimer, the term of this patent is extended or adjusted under 35 U.S.C. 154(b) by 411 days.

(21) Appl. No.: 11/078,949

(22) Filed: Mar. 7, 2005

(65) Prior Publication Data
US 2006/0196810 A1 Sep. 7, 2006

(51) Int. Cl.
*C10G 47/02* (2006.01)
*C10G 47/24* (2006.01)
*B01J 8/08* (2006.01)
*B01J 8/12* (2006.01)

(52) U.S. Cl. .................. 208/108; 422/213
(58) Field of Classification Search .......... 422/139, 422/140, 144, 145, 146, 147, 211, 212, 213, 422/214, 216, 217, 219, 223; 208/108
See application file for complete search history.

(56) References Cited

U.S. PATENT DOCUMENTS

| | | | | |
|---|---|---|---|---|
| 2,541,077 A | * | 2/1951 | Leffer | 422/144 |
| 2,560,343 A | * | 7/1951 | Hemminger | 422/223 |
| 2,697,686 A | * | 12/1954 | Leffer | 422/207 |
| 2,716,054 A | * | 8/1955 | Bergstrom | 422/216 |
| 2,965,454 A | | 12/1960 | Harper | |
| 4,411,773 A | | 10/1983 | Gross | |
| 4,871,699 A | | 10/1989 | Fahrig et al. | |
| 5,356,530 A | | 10/1994 | Calderon | |
| 5,552,034 A | | 9/1996 | Terry | |
| 5,853,568 A | | 12/1998 | Brander | |

* cited by examiner

*Primary Examiner*—Glenn Caldarola
*Assistant Examiner*—Randy Boyer

(57) ABSTRACT

The present invention consists of an improved method and apparatus to upgrade bitumen in various forms which comprises four main components; namely, a fractionator equipped with a condenser, a heavy gas oil catalytic treater, a catalyst regenerator/gasifier and a gas cleanup assembly. In operation, the bitumen in liquid form is fed to the fractionator for initial separation of fractions with the bulk of the bitumen leaving the bottom of the fractionator in the form of a heavy gas oil which is pumped to the catalytic treater and sprayed on a hot catalyst to crack the heavy gas oil (an endothermic reaction) to release lighter hydrocarbons in the form of $H_2$ rich volatile matter while depositing carbon on the catalyst. The volatile matter from the treater is directed to the fractionator where the condensable fractions are separated from the non-condensable $H_2$ rich gas, a valuable primary gas. The carbon containing catalyst from the treater is recycled to the regenerator/gasifier, and the catalyst after being regenerated (an exothermic reaction) is fed hot to the treater. Various fractions are removed from the fractionator as intermediates in the form of light napthas and light oils. The off-gas from the regenerator/gasifier is directed to a gas cleanup system to produce a valuable secondary gas. Both the primary gas and the secondary gas may be further utilized in the processing of the intermediates produced by the method, the primary gas being a source of $H_2$ and the secondary gas being a source of thermal energy.

28 Claims, 3 Drawing Sheets

US 7,413,647 B2

METHOD AND APPARATUS FOR UPGRADING BITUMINOUS MATERIAL

BACKGROUND OF THE INVENTION

This invention relates to a method and apparatus for treating hydrocarbon materials that are in the form of liquid or gaseous state which may also contain sulfur that needs to be removed in order for the materials to become benign from an environmental stand point, when consumed. These hydrocarbons may be derived from any of the following:-Heavy petroleum crude, tar sands, coal, oil shale, asphalt, syncrude, residium, oil refinery waste, and so forth. In the description of this patent application which follows the term "bitumen" shall be used exclusively to denote anyone or all of the above materials for the sake of simplifying the description of the invention.

The present invention encompasses improvements made to U.S. Pat. No. 5,356,530 issued to Albert Calderon. These improvements reside in structural modifications to better practice the method, in the manner of heating, in the movement of the solid catalyst, in desulfurization, in energy conservation and in the reduction of capital costs.

Briefly, the above mentioned reference comprises the charging of a petroleum material into a vessel having a cylindrical wall, then heating the wall indirectly. The petroleum material adjacent to the wall is heated to a temperature sufficient to crack hydrocarbons and form a layer of carbon against the wall, thus generating volatile matter which leaves the vessel, the carbon deposited next to the wall being periodically removed from the wall by scraping. The disadvantages of this reference are as follows:

The apparatus to carry out the method is cumbersome and complex, requiring large capital investment while at the same time making the process difficult to operate and to maintain. The material charged into the vessel upon heating becomes quite fluid and does not adhere to the wall of the vessel uniformly but runs down to the bottom of the vessel. Further, any carbon that is deposited against the wall forms an insulating barrier to the rest of the material within the vessel thus reducing the rate of heat transfer making the process inefficient. Great difficulty is experienced in the movement of the solid catalyst in gas cleanup system 23 (column 4, lines 46 & 47), in pyrolysis cylinder 24a (column 5 line 35) as well as in all other cylinders (vessels) by virtue of each vessel having a conical bottom for the discharging of the solid catalyst. Such conical shape often causes bridging of the catalyst within the vessel, which interrupts the flow of the catalyst thus causing forced shut-downs.

OBJECTIVES OF THE INVENTION

The current methods of processing Bitumen are in need of better ways to convert the Bitumen to high quality light products since the Bitumen is becoming heavier and declining in quality while its sulfur content is on the increase. This causes the production of by-products which have low value, difficult to market and costly to dispose of.

With the above and other considerations in view, the main object of the instant invention is to provide a much needed, improved process and apparatus to treat Bitumen to produce upgraded, high quality, low sulfur, light products.

Another object of the present invention is to upgrade the Bitumen efficiently with low capital investment requirement.

Still another object of the present invention is to provide an improved process and apparatus to practice same that is efficient and easily maintainable.

Further another object of the present invention is to provide an improved method and apparatus that minimizes its impact on the environment.

The above and other objects of the instant invention will become more apparent to those skilled in the art to which this invention pertains from the description hereinafter disclosed.

Reference is now made to the accompanying drawings forming a part of this specification wherein like reference characters designate corresponding parts in various views. It is to be understood that the embodiments shown herein and the phraseology used herein are for the purpose of description and not limitation. Other embodiments and phraseology may be used without departing from the spirit of the invention.

DETAILED DESCRIPTION OF DRAWINGS

Figure 1:
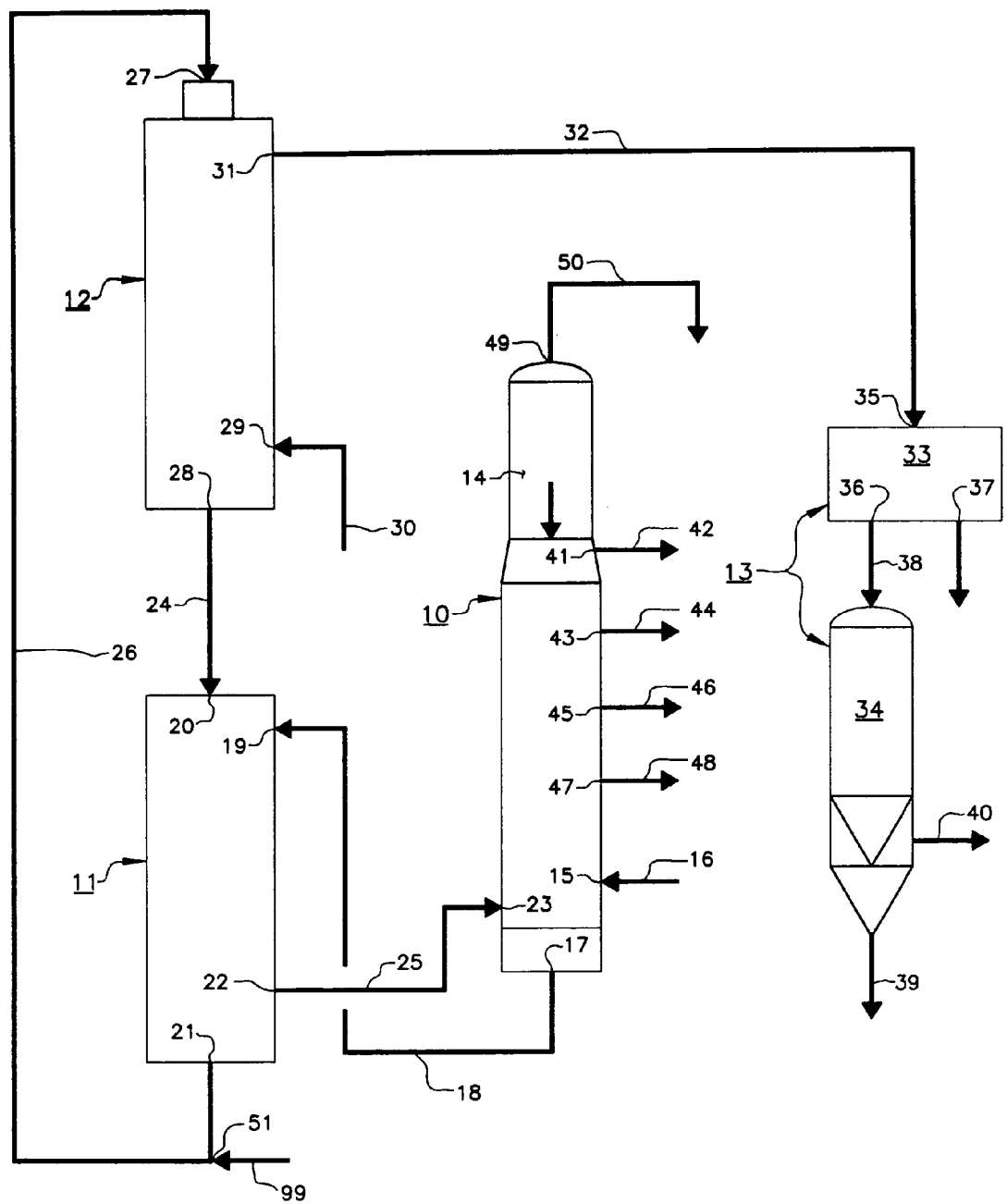
FIG. 1 is a flow diagram in block form, of the method and apparatus to practice the method.

Reference is made to FIG. 1 in which numeral 10 represents a fractionator which is equipped with a condenser denoted by numeral 14 which occupies the upper section of fractionator 10 and it is where the condensable portion of volatile matter is separated from non-condensable gas which is $H_2$ rich. Fractionator 10 possesses entry and exhaust ports; entry port 15 serves for the feed of the Bitumen which is in liquid state into fractionator 10 via conduit 16, and exit port 17 serves for the discharge of heavy gas oil out of it. The lighter fractions leave the fractionator via various ports and conduits, such as the light naptha via port 41 and conduit 42, the heavy naptha via port 43 and conduit 44, the light oil via port 45 and conduit 46, the atmospheric oil via port 47 and conduit 48, and the non-condensable $H_2$ rich gas via port 49 and conduit 50.

A catalytic treater denoted by numeral 11 which takes the form of a vessel, is provided and is connected to fractionator 10 via conduit 18 for the transport of the heavy gas oil from fractionator 10 to catalytic treater 11 and enter into it using port 19. Catalytic treater 11 which contains the catalyst is a fixed-level/moving bed; it receives hot regenerated catalyst through port 20 via conduit 24 and discharges spent catalyst through exit port 21. Exist port 22 is provided to catalytic treater 11 for exhausting volatile matter out of treater 11 which is fed to fractionator 10 via conduit 25 through entry port 23. Make-up catalyst is introduced through port 51 via conduit 99 to compensate for catalyst loss through degradation.

A spent catalyst regenerator/gasifier denoted by numeral 12, which takes the form of a vessel, is provided and is connected to catalytic treater 11 via transporter 26; regenerator/gasifier 12 which is also a fixed-level/moving bed, possesses entry port 27 to receive the spent catalyst from transporter 26 and exit port 28 to discharge hot regenerated catalyst into catalytic treater 11 via conduit 24. Regenerator/gasifier 12 further possesses entry port 29 for the addition of an oxidant delivered by conduit 30 and exit port 31 for exhausting off-gas using conduit 32, for delivery to the gas cleanup system which is denoted by numeral 13.

Cleanup system 13 comprises two sections; section 33 and section 34. Section 33 serves as a separation/condenser to separate condensable matter from non-condensable gas which contains entrained particulate matter, and part 34 serves as a component to remove the entrained particulate matter from the gas. Section 33 is also provided with entry port 35 and exit ports 36 and 37, with exit port 36 being used for the non-condensable gas containing the particulate matter and exit port 37 being used for the condensable matter as for example sulfur. Section 33 which is connected to section 34 via conduit 38, enables the feeding of the non-condensable gas to section 34. Section 34 may take the shape of a filter such as a baghouse wherein the particulate matter is separated from the non-condensable gas and exits section 34 via conduit 39 while the gas exits via conduit 40.

Figure 2:
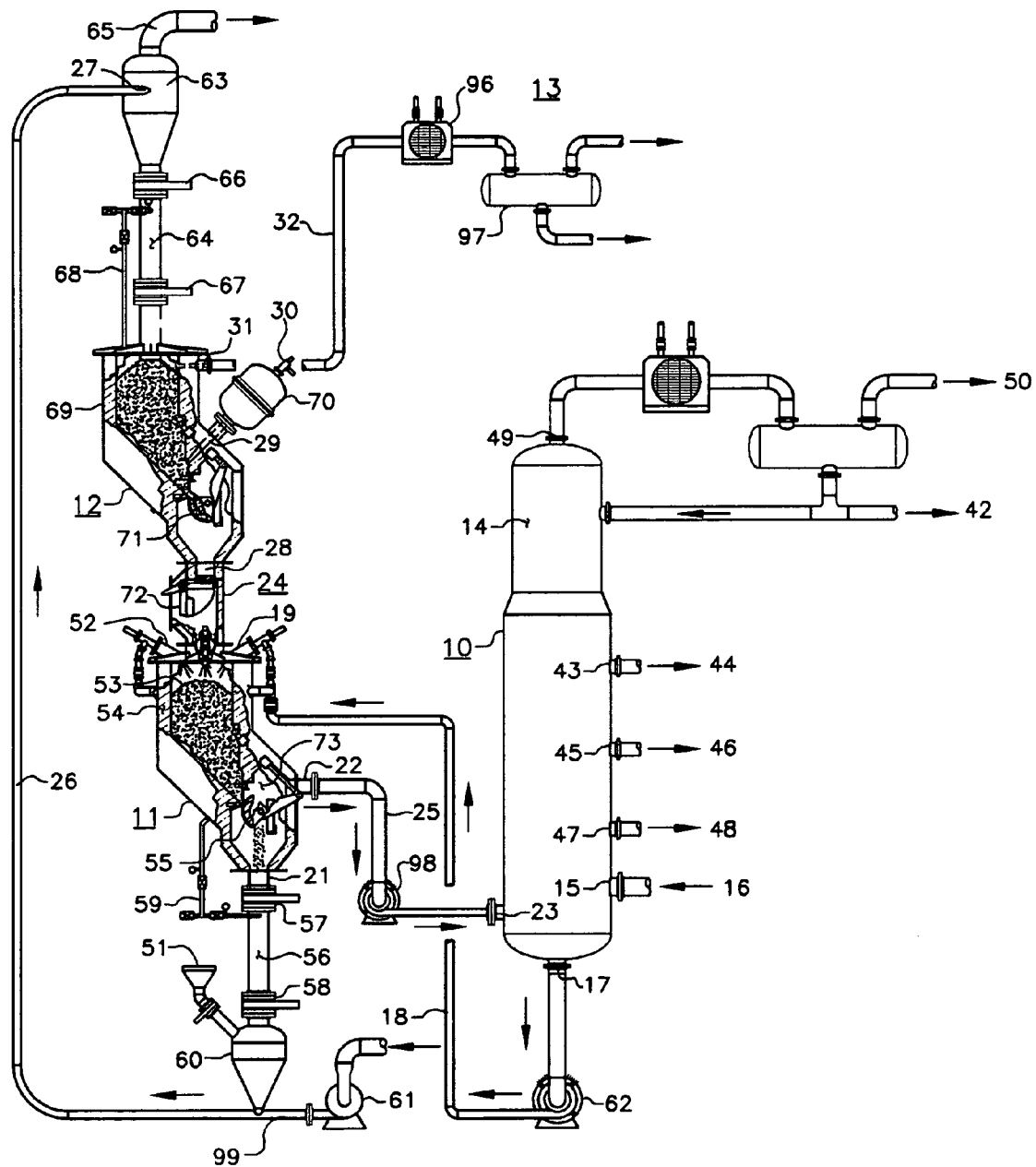
FIG. 2 is the overall structural representation of the apparatus to carry out the method.

Referring to FIG. 2, fractionator 10, catalytic treater 11, regenerator/gasifier 12 and gas cleanup assembly 13, are illustrated with emphasis being placed on structural detail of treater 11 and regenerator/gasifier 12. A pump denoted by numeral 62 is provided to force the flow of heavy gas oil from the bottom of fractionator 10 to the top of catalytic treater 11 wherein a spray system marked by numeral 52, is adapted to distribute the heavy gas oil over and across the catalyst which is denoted by numeral 53. Treater 11 whose internal walls are lined with insulating/refractory material 54, is configured in such a way as to enhance the downward flow of the catalyst in order to overcome bridging and hang-ups which are common when handling solids in hoppers and bunkers. For clarity, this configuration will be described in more detail hereinafter in FIGS. 3 and 4. At the discharge of treater 11 an oscillating feeder denoted by numeral 55, is used to control the flow of the spent catalyst out of treater 11. Above feeder 55 a plenum chamber denoted by numeral 73 is provided for the collection of the volatile matter and for exhausting it out of treater 11 via port 22 into conduit 25 which leads to fractionator 10. A compressor marked by numeral 98 is provided to boost the pressure of the volatile matter prior to its entry into fractionator 10 via port 23.

Beneath the bottom of treater 11, lock-chamber 56 is disposed; it possesses an upper valve marked by numeral 57 and a lower valve marked by numeral 58. To equalize the pressure between treater 11 and lock-chamber 56, a pressure equalizing pipe with appropriate isolation valves denoted by numeral 59, interconnects chamber 56 with the bottom of treater 11. A surge tank denoted by numeral 60 is provided under lock-chamber 56 for the pneumatic transport of the spent catalyst by utilizing compressor 61 in order to provide carrier gas at elevated pressure to pneumatically lift the spent catalyst via conduit 26 to the top of regenerator/gasifier 12 which is with few exceptions, similar in configuration to treater 11. Means for the introduction of make-up catalyst denoted by numeral 51, is provided to surge tank 60.

A cyclone and a lock-chamber denoted by numerals 63 and 64 respectively are provided on top of regenerator/gasifier 12. Cyclone 63 is equipped with exhaust port 65 and lock-chamber 64 is equipped with control valves 66 and 67. A pressure equalizing pipe with appropriate isolation valves, denoted by numeral 68, interconnects lock-chamber 64 and regenerator/gasifier 12 which has its internal walls lined with insulation/refractory material 69 and is configured structurally the same as treater 11 in such a way as to enhance the downward flow of the catalyst without causing hang-ups. A burner and an oscillating feeder are provided to regenerator/gasifier 12. The burner denoted by numeral 70 initiates the regeneration and gasification reactions and insures that the temperature of the catalyst is at the required level prior to its feed into treater 11. The feeder denoted by numeral 71 controls the flow of the regenerated catalyst while hot, out of regenerator/gasifier 12 and into treater 11 via a conduit denoted by numeral 24.

Figure 3:
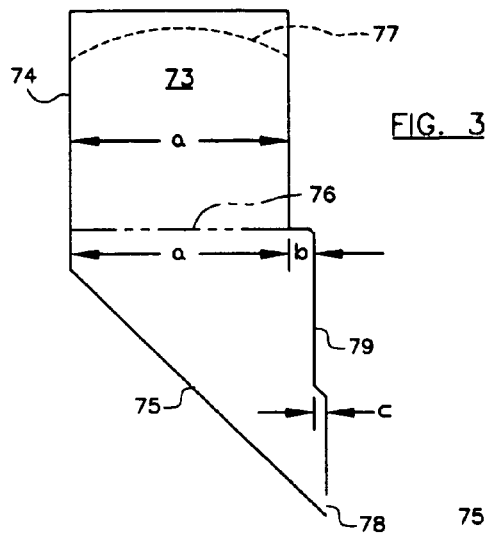
FIGS. 3, 4, 5, 6 and 7 are details of certain parts of the apparatus to carry out specific functions used in the method.
Figure 4:
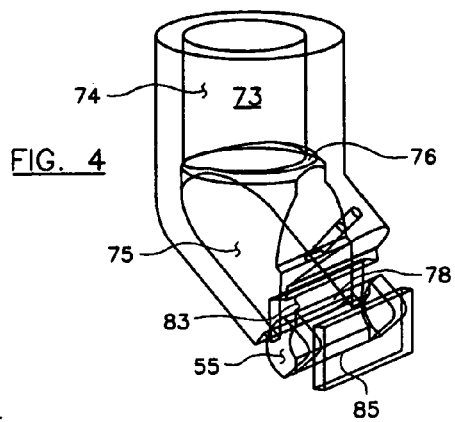
Figure 5:
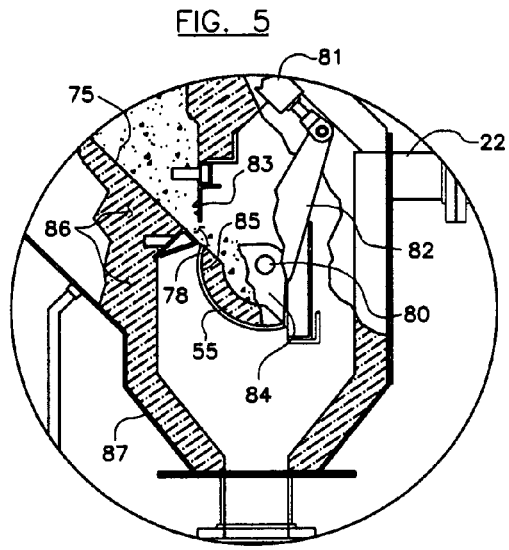
Figure 6:
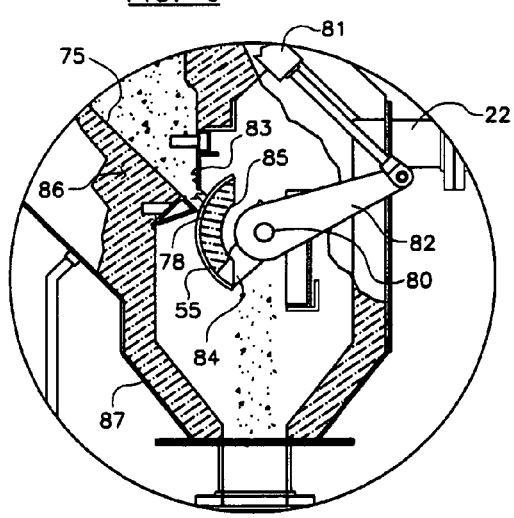
Figure 7:
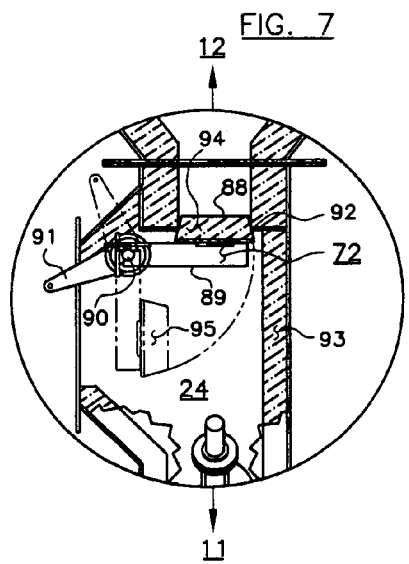

Referring now to FIGS. 3, 4, 5, 6 and 7 for a detailed description of each illustration, FIGS. 3 and 4 will aid in describing structural features of catalytic treater 11 and of regenerator/gasifier 12 to insure the downward flow of the solid catalyst which is in pebble form, without bridging in order to effect the desired reactions. FIGS. 5 and 6 will aid in describing the mechanical features incorporated in treater 11 and regenerator/gasifier 12 to control the feed of the solid catalyst in order to maintain the fixed-level/moving bed attributes of the method for steady state operation. FIG. 7 will aid in describing the mechanical and gas flow control in order to maintain the functions in treater 11 separate from the functions of regenerator/gasifier 12 and vice-versa.

FIGS. 3 and 4 illustrate the preferred common structure denoted by numeral 73, in outline form of treater 11 and regenerator/gasifier 12, since the design of both being similar. Structure 73 is divided into an upper vertical wall section marked by numeral 74 and dimensioned by the letter "a", and a lower sloped section marked by numeral 75 which is larger than section 74 and is dimensioned by the letters "a" and "b", with the transition from the vertical wall configuration to the sloped configuration taking place essentially at the phantom line denoted by numeral 76 in FIG. 3. Section 74 and section 75 may take any geometric shape such as a round, a square, a rectangle, etc. The catalyst in both treater 11 and regenerator/gasifier 12 moves downwardly by gravity from section 74 to section 75 and is discharged via an aperture which preferably is in the form of an elongated slot denoted by numeral 78. A fixed level is maintained at the top of section 74 at dotted line 77 by the addition of catalyst. An increment in dimension may also be added above slot 78 to vertical side 79 of sloped section 75, which is dimensioned by the letter "c", to give additional relief in order to further facilitate the downward movement of the catalyst. The above described structure provides an ever expanding room during the descent of the catalyst in both treater 11 and regenerator/gasifier 12.

Referring to FIGS. 5 and 6 which are alike except for the feeding position of oscillating feeder 55 in FIG. 5 and the discharging position of oscillating feeder 55 in FIG. 6. Oscillating feeder 55 which is pivotally mounted by means of pivot 80, is inter-connected to actuating hydraulic cylinder 81 through link arm 82 in order to swing feeder 55 from its feeding position to it discharging position. An adjustment to slot 78 is provided by means of vertical plate 83 which is adapted to be raised or lowered in order to increase or decrease the rate of feed of the catalyst from section 75. Feeder 55 which is refractory lined takes the shape of a long cradle denoted by numeral 85 shown isometrically in FIG. 4 with end plates such as plate 84, to contain the catalyst within the cradle. The catalyst slides into the cradle by virtue of sloped section 75 exceeding the angle of repose with cradle 85 being in the position shown in FIG. 5. As cradle 85 assumes the position shown in FIG. 6 the catalyst within cradle 85 is discharged while the feed of the catalyst from sloped section 75 is interrupted. To minimize heat loss insulation as denoted by numeral 86, is disposed against shell 87.

Referring to FIG. 7, conduit 24 that integrates regenerator/gasifier 12 to treater 11 takes the shape of an insulated downcomer 93 through which the regenerated catalyst moves downwardly. This downcomer possesses an intermediate element which takes the form of a swinging gate denoted by numeral 72; it provides physical separation between catalytic treater 11 and regenerator/gasifier 12. Swinging gate 72 takes the form of a refractory plug denoted by numeral 88, which is integrated to arm 89 that is adapted to rotate about pivot 90; gate 72 which is shown in the closed position 94 (solid lines) and in the opened position 95 (phantom lines), is actuated by means of a cylinder (not shown) engaging arm 91. Plug 88 is made tapered in order to seal against a seat 92 which is disposed in the refractory.

Description of Operation

In describing the operation of the instant invention reference will be made to all the Figures but especially to FIG. 2 with respect to the overall method. Assuming that the method is at steady state with catalytic treater 11 and regenerator/gasifier 12 charged with the catalyst which is in pebble form, to a set level that would be maintained fixed in treater 11 and in regenerator/gasifier 12. Further, assuming that the process is in a dynamic state by virtue that the catalyst is being discharged from the bottom of treater 11 by means of feeder 55 and elevated to the top of regenerator/gasifier 12 by transporter 26 while the catalyst is discharged from the bottom of regenerator/gasifier 12 by means of feeder 71 into treater 11 via conduit 24 in order to maintain the set level of the catalyst in both treater 11 and regenerator/gasifier 12, substantially fixed. Any degradation of the pebble catalyst which is in the form of fines, removed from the system via entrainment in the off-gas exiting the top of regenerator/gasifier 12 via exit port 31, is made up by the introduction of fresh pebble catalyst via hopper 51.

Burner 70 insures that the regenerated catalyst is at the proper temperature as it is fed into treater 11 from the bottom of regenerator/gasifier 12 via conduit 24. It is to be noted that the reactions taking place within treater 11 and within regenerator/gasifier 12 are conducted at pressure, and are endothermic within treater 11 and exothermic within regenerator/gasifier 12. With respect to the flow of gases within treater 11 and regenerator/gasifier 12, it is preferred to have the flow of the gases within treater 11, co-current with the downward movement of the catalyst, and counter-current with the downward movement of the catalyst within regenerator/gasifier 12. Further it is critical that gases from regenerator/gasifier 12 are prevented from migrating from regenerator/gasifier 12 to treater 11, while gases from treater 11 are free to migrate from treater 11 to regenerator/gasifier 12 by virtue of operating treater 11 at a higher pressure than regenerator/gasifier 12 while gate 72 is being opened. Gate 72 within conduit 24 when closed separates treater 11 from regenerator/gasifier 12. When gate 72 is opened to discharge hot regenerated catalyst into treater 11 the higher pressure within treater 11 insures the flow of gases to migrate from treater 11 into regenerator/gasifier 12 and not vice-versa.

Preferably, Bitumen is initially injected into fractionator 10 via conduit 16 to remove any lighter intermediates it may contain; the bulk of it is mixed with recyclable oil from the bottom of fractionator 10 in the form of a heavy gas oil which leaves via exit port 17 to be processed in treater 11. Pump 62 directs the heavy gas oil to the top of catalytic treater 11 and by means of distributor 52 the heavy gas oil is sprayed on top of the hot catalyst which is at about 1200° C. as it is discharged from the bottom of regenerator/gasifier 12 into treater 11. At this temperature substantial cracking of the heavy gas oil takes place while depositing carbon on the catalyst generating a volatile matter having entrained lighter hydrocarbons produced from the heavy gas oil. The catalyst which possesses properties to cause cracking may also possesses desulfurization properties which will result not only in the cracking of the heavy gas oil but also in desulfurizing the volatile matter produced from it. The carbon containing catalyst moves downwardly as a moving bed by gravity, and the volatile matter is directed downwardly also by forcing the volatile matter to exit within treater 11 at port 22 which is located substantially at the bottom of treater 11. As feeder 55 continually removes carbon containing catalyst from the bottom of treater 11, hot regenerated catalyst is made to flow from the bottom of regenerator/gasifier 12 to the top of treater 11 via conduit 24 to maintain a fixed level within treater 11. The spent (or partially spent) catalyst is separated from the volatile matter in a disengagement plenum denoted by numeral 73 located at the bottom of treater 11 above feeder 55. Because of seals and materials of construction it is preferred to have the catalyst and the volatile matter leave treater 11 at a temperature of about 500° C.

The volatile matter leaving treater 11 via exit port 22 and aided by booster compressor 98 is directed to enter fractionator 10 via port 23, wherein the fractions of the treated product are separated into light naptha, heavy naptha, light oil, atmospheric oil, etc. and the residual heavy gas oil is recycled with the on coming Bitumen to treater 11. The non-condensable $H_2$ rich gas, in the volatile matter which is a very valuable primary gas by virtue of its being a much needed resource, is utilized for the further upgrading of the fractions produced including the removal of sulfur.

From the bottom of treater 11, the catalyst is fed to lockhopper 56 thence to a transporter such as a pneumatic transporter, via conduit 26 by making use of blower 61. The catalyst is thus transported to the top if regenerator/gasifier 12. Regeneration of the carbon containing catalyst takes place in the lower part of regenerator/gasifier 12 by obtaining ignition via burner 70 and adjusting the the air to fuel ratio, the carbon on the catalyst is consumed in a reduced atmosphere in order to convert it into fuel gas (a valuable secondary gas) via gasification. By maintaining the atmosphere reducing and air is used as an oxidant, a lean gas similar to a producer gas is generated; whereas, if the oxidant is substantially pure oxygen a medium Btu gas is produced; and, if steam is added to the oxygen a syngas ($CO+H_2$) is produced. The production of these various gases is determined by the ultimate use of such gas.

In the event that the catalyst in treater 11 is used for cracking as well as desulfurization, the catalyst will be a carrier for both carbon and sulfur. During regeneration the carbon in the presence of the oxidant in a reducing atmosphere can act as a reductant to result in the release of the sulfur from the catalyst as elemental sulfur. The off-gas from the regenerator leaving the regenerator/gasifier 12 at exit port 31 is guided by conduit 32, to heat exchanger 96 to condense the sulfur and be separated from the off-gas in separator 97.

Since the uniform and unrestricted downward movement of the catalyst is vital to the method, the special structural sections which form the configurations in both regenerator/gasifier 12 and treater 11 are designed in such a way as to provide a controlled feed that is maintained unrestricted in regenerator/gasifier 12 and treater 11 by passing through larger dimensional structures as the catalyst is proceeding in its descent. This was explained in detail in FIGS. 3 and 4 earlier in the specification during the description of the apparatus to carry out the method.

All in all, it is submitted that the present invention provides an improved method and apparatus for the upgrading of bituminous materials, which makes possible the efficient rejection of carbon from such materials and gasifying them in an environmentally acceptable manner for the production of valuable, lighter liquids from low-value materials. Further, the method produces a primary hydrogen-rich gas, which is useful in the treatment and enhancement of the liquids produced; the gas produced from gasification (a secondary gas) is consequently used to provide economical thermal energy for the process and/or for the generation of electric power or steam

We claim:

1. A method for producing lighter hydrocarbons from bituminous material comprising the following:

providing a hot catalyst in a downflow catalytic treater at such a temperature as to cause the break-up of bonds of heavy hydrocarbons contained in bituminous material, said treater being configured with a downward increased clearance to enhance the flow of said catalyst;

injecting bituminous material on said hot catalyst to generate a volatile matter while depositing carbon from said bituminous material on said catalyst to result in producing lighter hydrocarbons entrained in said volatile matter and a carbon containing catalyst;

separating said volatile matter from said carbon containing catalyst;

feeding said volatile mailer to a fractionator to divide it into various fractions;

directing said carbon containing catalyst from the downflow catalytic treater through an elongated slot configured to avoid bridging of the catalyst and to a downflow regenerator/gasifier that is configured with a downward increased clearance to enhance the flow of said carbon containing catalyst, wherein said carbon is removed from said catalyst via gasification with an oxidant to result in:

(i) regenerating said catalyst while producing an off-gas; and (ii) heating said catalyst by the release of thermal energy caused by the gasification of the carbon contained in said catalyst to provide at least a portion of the thermal energy required to break-up bonds of heavy hydrocarbons contained in bituminous material; and feeding said heated, regenerated catalyst from said regenerator/gasifier through an elongated slot configured to avoid bridging of the catalyst and to said treater for the break-up of heavy hydrocarbons contained in the bituminous material which is injected into said treater.

2. The method as set forth in claim 1 includes the carrying out of the operation of the method at a positive pressure.

3. The method as set forth in claim 1 wherein the step of feeding said volatile matter to a fractionator to divide it into various fractions is further characterized by the step of producing condensable lighter liquids and a non-condensable gas which is rich in hydrogen.

4. The method as set forth in claim 3 includes the utilizing of said gas which is rich in hydrogen to further decrease the carbon in said lighter liquids.

5. The method as set forth in claim 1 wherein the step of injecting bituminous material on said hot catalyst to generate a volatile matter while depositing carbon from said bituminous material on said catalyst is further characterized by the step of moving said volatile mailer and said catalyst downwardly and co-currently.

6. The method as set forth in claim 5 includes the moving of said catalyst downwardly in such a way as to experience no impediment to the flow of said catalyst by providing an ever increasing clearance through which said catalyst passes.

7. The method as set forth in claim 1 wherein the step of directing said carbon containing catalyst to a regenerator wherein said carbon is removed from said catalyst with an oxidant to result in regenerating said catalyst while producing an off-gas is further characterized by the step of moving said catalyst downwardly and moving said off-gas upwardly to result in a counter-current movement relationship between said catalyst and said off-gas.

8. The method as set forth in claim 7 includes the utilizing of said off-gas as a source of energy by virtue of its thermal capacity.

9. The method as set forth in claim 1 wherein the step of providing a hot catalyst in a treater at such a temperature as to cause the break-up of bonds of heavy hydrocarbons contained in bituminous material is further characterized by the step of including sulfur absorption properties to said catalyst in order to absorb sulfur while the break-up of bonds of heavy hydrocarbons contained in bituminous material, occurs.

10. The method as set forth in claim 9 includes the release of sulfur from said catalyst during its regeneration.

11. The method as set forth in claim 1 includes the positioning of said catalytic treater beneath said regenerator/gasifier and communicating the two with an interconnecting conduit to provide an efficient manner of transferring hot regenerated catalyst from said regenerator/gasifier to said treater with minimum loss of thermal energy.

12. The method as set forth in claim 11 further comprising the step of interposing an isolation valve within said conduit to provide internal physical separation yet external union.

13. The method as set forth in claim 1 includes the recycling of said catalyst from said catalytic treater to said regenerator/gasifier, and from said regenerator/gasifier to said catalytic treater.

14. The method as set forth in claim 13 includes the heating of the catalyst in said regenerator/gasifier and the cooling of the catalyst in said treater.

15. The method as set forth in claim 11 comprising the step of permitting the migration of gases from said treater to said regenerator/gasifier and preventing the migration of gases from said regenerator/gasifier to said treater.

16. Apparatus for treating a carbon containing material in the form of a solid, a liquid, a gas or a combination thereof, with a hot catalyst including:

a first vessel which is configured for the downflow of said catalyst having a downward increased clearance to enhance the flow of said catalyst and being equipped with a feeder that is capable of controlling the flow of said catalyst out of said first vessel through an elongated slot configured to avoid bridging of the catalyst;

a second vessel which is configured for the downflow of said catalyst having a downward increased clearance to enhance the flow of said catalyst and being equipped with a feeder that is capable of controlling the flow of said catalyst out of said second vessel through an elongated slot configured to avoid bridging of the catalyst;

conduit means interposed between said first vessel and said second vessel in such a way as to enable the transfer of said catalyst from said first vessel to said second vessel and from said second vessel to said first vessel;

means disposed to said first vessel adapted to introduce said material in such a way as for the material to come in contact with said hot catalyst to cause the removal of carbon from said material with the aid of thermal energy while depositing such carbon on said catalyst;

means disposed to said second vessel adapted to introduce an oxidant in such a way as to cause the carbon deposit on said catalyst to be gasified with said oxidant to produce an off-gas and a regenerated catalyst containing sufficient thermal energy to furnish at least a portion of the thermal energy required for the removal of the carbon from said material; and means disposed to the walls of said first vessel and said second vessel wherein heat loss is minimized.

17. The apparatus as set forth in claim 16 further includes means adapted to maintain a level of the catalyst substantially fixed within said first vessel and said second vessel.

18. The apparatus as set forth in claim 16 further includes means that unite said first vessel and said second vessel to form a single unitized structure instead of two separate vessels.

19. The apparatus as set forth in claim 16 further includes means adapted to control the operation at pressure.

20. The apparatus as set forth in claim 16 further includes means for cleanup of said off-gas.

21. The apparatus as set forth in claim 16 further includes means adapted to process bituminous material.

22. The apparatus as set forth in claim 16 further includes fractionator means adapted to separate the processed material into fractions.

23. The apparatus as set forth in claim 16 further includes means adapted to process material which contains sulfur.

24. The apparatus as set forth in claim 16 further includes expansion means configured in said first vessel and said second vessel in such a way as to have the walls that contain said catalyst, increase dimensionally in the direction of the flow of the catalyst in order to enhance the movement of said catalyst and prevent hang-ups of the catalyst within said first and second vessels.

25. The apparatus as set forth in claim 16 wherein said feeder of said first vessel and said feeder of said second vessel include cradle means adapted to swing about a pivot for the control of the flow of the catalyst.

26. The apparatus as set forth in claim 16 wherein said conduit means interposed between said first vessel and said second vessel, possesses valve means mounted within said conduit and being adapted to open and close, and wherein in the open position said valve integrates said first vessel to said second vessel while discharging hot regenerated catalyst from said second vessel to said first vessel and in the closed position said valve is adapted to isolate said first vessel from said second vessel.

27. The apparatus as set forth in claim 17 wherein said means which is adaptable to maintain a level of the catalyst includes means capable of adding makeup of fresh catalyst to compensate for catalyst degradation in order to maintain the levels substantially fixed within said first and said second vessels.

28. The apparatus as set forth in claim 16 wherein said means disposed to said first vessel adapted to introduce said material includes a liquid spraying means disposed to said first vessel.

* * * * *